United States Patent
Skweres et al.

(10) Patent No.: US 11,420,607 B2
(45) Date of Patent: Aug. 23, 2022

(54) BRAKE CONTROL VALVE ASSEMBLY

(71) Applicant: Westinghouse Air Brake Technologies Corporation, Wilmerding, PA (US)

(72) Inventors: Jeffrey B. Skweres, McKeesport, PA (US); Nicholas L. Bressler, Export, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 213 days.

(21) Appl. No.: 16/722,331

(22) Filed: Dec. 20, 2019

(65) Prior Publication Data

US 2020/0198613 A1 Jun. 25, 2020

Related U.S. Application Data

(60) Provisional application No. 62/783,907, filed on Dec. 21, 2018.

(51) Int. Cl.
*B60T 15/36* (2006.01)

(52) U.S. Cl.
CPC .................. *B60T 15/36* (2013.01)

(58) Field of Classification Search
CPC ...... B60T 15/36; B60T 15/021; B60T 15/022; B60T 15/302; B60T 15/42; B60T 15/024; B60T 13/665; B60T 17/228
See application file for complete search history.

(56) References Cited

U.S. PATENT DOCUMENTS

| | | | | |
|---|---|---|---|---|
| 2,099,392 A | * | 11/1937 | Good ................... | B60T 15/024 303/42 |
| 3,208,801 A | * | 9/1965 | McClure ............... | B60T 15/302 303/36 |
| 3,716,274 A | * | 2/1973 | Pier ....................... | B60T 15/184 303/20 |
| 4,033,632 A | * | 7/1977 | Wilson .................. | B60T 15/18 303/74 |
| 4,106,819 A | * | 8/1978 | Hart ....................... | B60T 15/18 303/38 |
| 9,616,872 B2 | * | 4/2017 | Skweres ................ | B60T 13/665 |

* cited by examiner

*Primary Examiner* — Pamela Rodriguez
(74) *Attorney, Agent, or Firm* — The Small Patent Law Group LLC; Josef L. Hoffman

(57) ABSTRACT

An assembly may be provided that may include a valve body having a piston within a piston bore in the valve body, the piston bore including a valve chamber section and a brake pipe section such that a pressure differential between the valve chamber section and the brake pipe section moves the piston within the piston bore. The assembly may also include a slide valve seat coupled to the valve body. The slide valve seat may include a brake pipe port, an additional discharge channel pilot valve port, and at least one exhaust port, and a slide valve coupled to the piston and configured to move along the slide valve seat with the piston. The slide valve may be configured to move between at least a piloting position and an exhaust position to vary an exhaust rate of the brake pipe section and an exhaust rate of the valve chamber section during braking.

20 Claims, 9 Drawing Sheets

BRAKE CONTROL VALVE ASSEMBLY

CROSS-REFERENCE TO RELATED APPLICATIONS

This application claims priority to U.S. Provisional Patent Application No. 62/783,907, filed Dec. 21, 2018, the entire disclosure of which is incorporated herein by reference.

BACKGROUND

Technical Field

The present disclosure relates to a brake apparatus for vehicles and, more particularly, to a brake control valve.

Discussion of Art

Vehicle braking systems may use pneumatic forces to slow and stop a vehicle. Vehicles systems may have multiple vehicles, some that can generate propulsion, while others are non-propulsion generating vehicles. Still, the braking system must brake each vehicle in the vehicle system. As an example, rail vehicles may operate by charging and discharging compressed air to and from one or more storage reservoirs located on each vehicle.

Railway vehicle braking systems are typically controlled by an operator. When actuated by the operator, the brake valve is moved to exhaust compressed air in the brake pipe. The decrease in brake pipe pressure is sensed by individual brake control valves on each vehicle of the vehicle system. Each brake control valve then directs air pressure from one or more storage reservoirs on the vehicle directly into a brake cylinder to apply a force to a brake rigging system, which then applies the brakes on the vehicle. To release the brakes, the air pressure in the brake pipe must be restored to cause the brake control valve to exhaust the pressure in the brake cylinder(s) to thereby release the brakes. With brake pipe pressure being recharged, the air pressure in the storage reservoirs is also restored to be equivalent to the brake pipe pressure. Both the brake pipe and the storage reservoirs remain fully charged until the next subsequent brake application is made.

During manufacture and assembly of components for a vehicle braking system a slide valve of a distributor valve, and the brass bushing defining the slide valve seat are assembled. During assembly, special care must be taken to prevent leaks through various ports of the distributor valve. The components of the main piston assembly of the distributor valve, such as the slide valve and the slide valve seat, are commonly made from a metal material, particularly brass, which requires special machining operations to assure proper sealing between the slide valve face and the slide valve seat. The slide valve seat is formed in a cylindrical bushing having a lapped surface which must undergo a broaching operation to precisely machine the bushing bore. During assembly, the exterior surface of the machined tapered bushing is coated with paint/adhesive before being pressed into a corresponding tapered bore in the valve body. If any port-to-port leakage exists once the bushing is pressed into the valve body, the bushing must be removed from the valve body and the tapered bore in the valve body is re-machined to a slightly larger diameter in order to accept a correspondingly larger tapered bushing. All of these operations add time and additional rework cost to the manufacture of the control valve. Furthermore, because the slide valve seat is a key product characteristic of the pressed-in bushing, service and repair of the slide valve and/or the slide valve seat often requires the same time-consuming and expensive steps.

BRIEF DESCRIPTION

In accordance with one embodiment, an assembly may be provided that may include a valve body having a piston within a piston bore in the valve body, the piston bore including a valve chamber section and a brake pipe section such that a pressure differential between the valve chamber section and the brake pipe section moves the piston within the piston bore. The assembly may also include a slide valve seat coupled to the valve body. The slide valve seat may include a brake pipe port. The assembly may also include an additional discharge channel pilot valve port, and at least one exhaust port, and a slide valve coupled to the piston and configured to move along the slide valve seat with the piston. The slide valve may be configured to move to establish selective fluid communication between the brake pipe port, the additional discharge channel pilot valve port, and the at least one exhaust port based on a position of the slide valve relative to the slide valve seat. The slide valve may be configured to move between at least a piloting position and an exhaust position. The brake pipe port may be in fluid communication with the additional discharge channel pilot valve port while the slide valve is in the piloting position, and the brake pipe port may be in fluid communication with the at least one exhaust port while the slide valve is in the exhaust position. The slide valve may also be configured to move between the piloting position and the exhaust position to vary an exhaust rate of the brake pipe section and an exhaust rate of the valve chamber section during braking.

In accordance with one embodiment, a method may be provided that may include moving a piston having a slide valve within a piston bore having a valve chamber section and a brake pipe section based on a pressure differential between the valve chamber section and the brake pipe section, conveying brake pipe fluid through a brake pipe port of a slide valve seat to the valve chamber section, an additional discharge channel pilot valve port, and at least one exhaust port based on movement of the slide valve in relation to the slide valve seat, and varying an exhaust rate of the brake pipe fluid from the brake pipe section and the valve chamber section during braking of a vehicle based on a position of the slide valve in relation to the slide valve seat.

In accordance with one embodiment, an assembly may be provided that may include a body having a bore and a piston movable within the bore, the bore including a valve chamber section and a brake pipe section wherein a pressure differential between the valve chamber section and the brake pipe section moves the piston within the bore. The assembly may also include a seat configured to mate with and be removably coupled with the body, the seat including a first port, a second port, and a third port, and a slide valve coupled to the piston and configured for movement with the piston. The slide valve may be configured to move along the seat to establish selective fluid communication between the first port, the second port, and the third port based on a slide valve position relative to the seat. The slide valve may be configured to have an exhaust position where the first port is in fluid communication with the third port to vary an exhaust rate of the brake pipe section and of the valve chamber section during braking.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to an assembly for a braking system for use with vehicles and vehicle systems that have multiple braking component that are varied distances from one another. Example vehicle systems include rail vehicles that may include multiple propulsion and non-propulsion vehicles, elongated vehicles such as tractor trailers, or the like. In particular, the vehicle may be a non-rail vehicle that includes a pneumatic or fluid-handling system. When used herein, fluid may include gas, pressurized gas, liquid, pressurized liquid, etc. The example braking systems include a distributor valve with a slide valve that moves with the main piston of the distributor valve to move along a corresponding face of a slide valve seat. The slide valve seat is matingly and removably coupled to the distributor valve body to facilitate replacement of the slide valve seat for repair. The slide valve and slide valve seat have corresponding ports that are configured to communicate with a piloting valve to provide decreasing rates of brake pipe section and valve chamber section pressures solely dependent upon the relative distance the distributor valve is away from a lead end of a vehicle system.

Figure 1A:
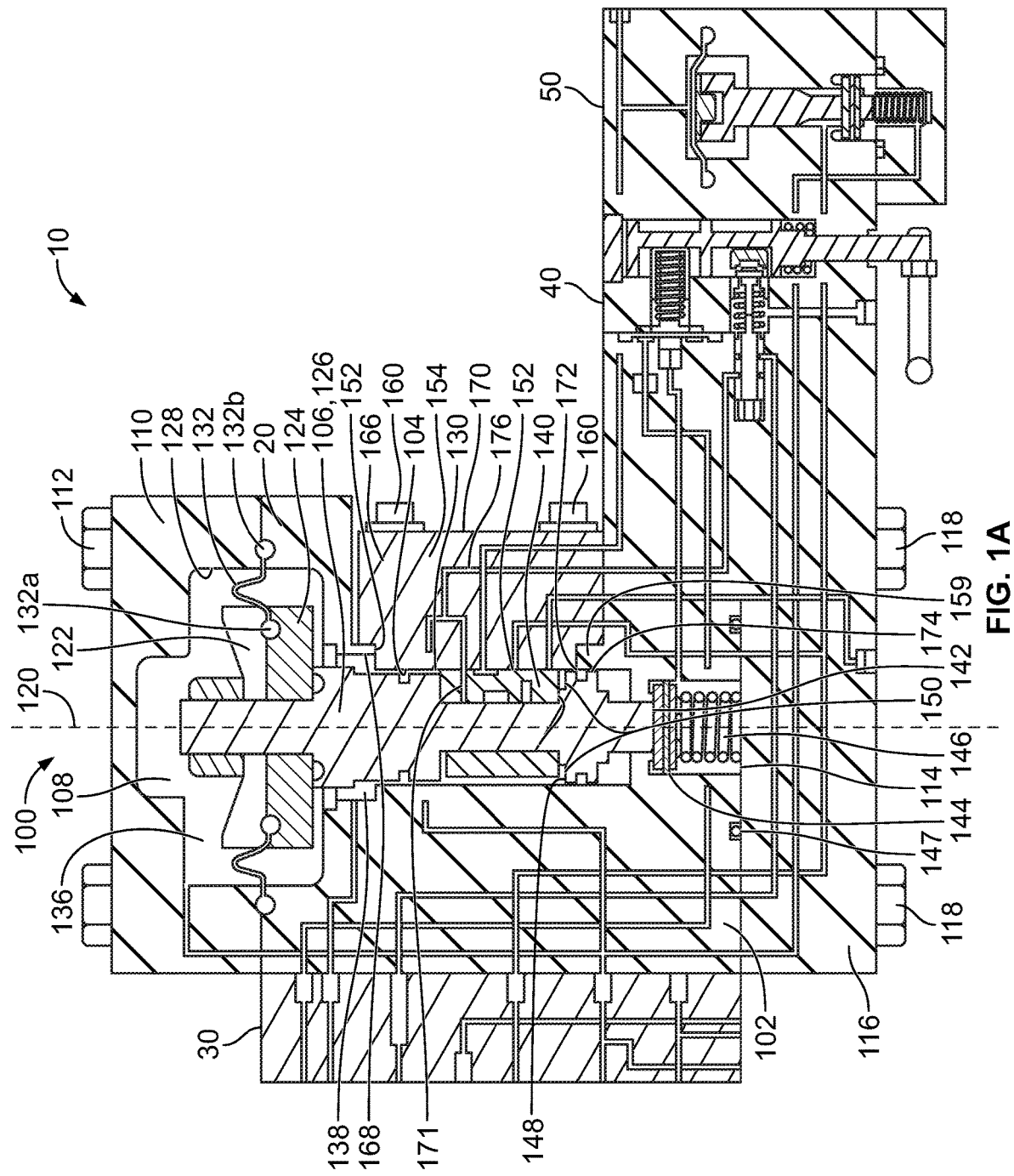
FIG. 1A is a side cross-sectional view of a main-line brake control valve portion.

Referring to FIG. 1A, a brake control valve 10 (also known as a "distributor valve") is shown in accordance with one example. In some examples, the brake control valve has a main-line portion brake valve 20. The main-line portion may be combined with a pipe bracket portion 30 and a main portion (not shown). In other examples, the brake control valve may be configured for use with a service portion or an emergency portion of a brake control valve sold by Wabtec Corporation under the ABDX® tradename that may be used in freight rail applications in markets governed by the Association of American Railroad (AAR) standards. The mainline portion has a main piston subassembly 100, a switch subassembly 40, and an additional discharge channel valve subassembly 50. The brake control valve is shown separate from the pipe bracket and other ancillary components of a vehicle brake system, which are omitted for clarity of disclosure. The brake control valve may be configured for coupling with a pipe bracket and other ancillary components to complete the vehicle brake system.

Figure 1B:
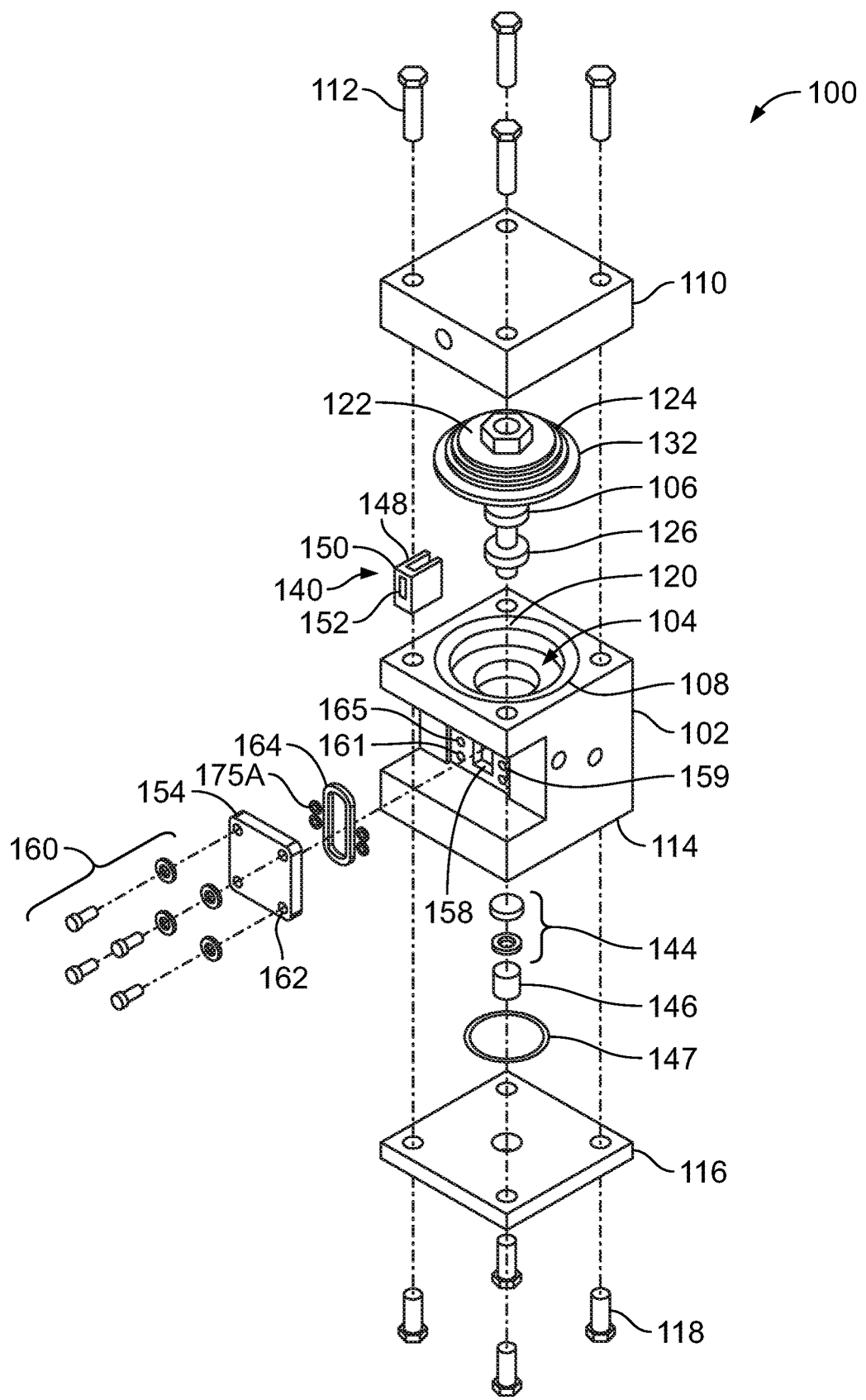
FIG. 1B is an exploded perspective view of a main piston subassembly.
Figure 1C:
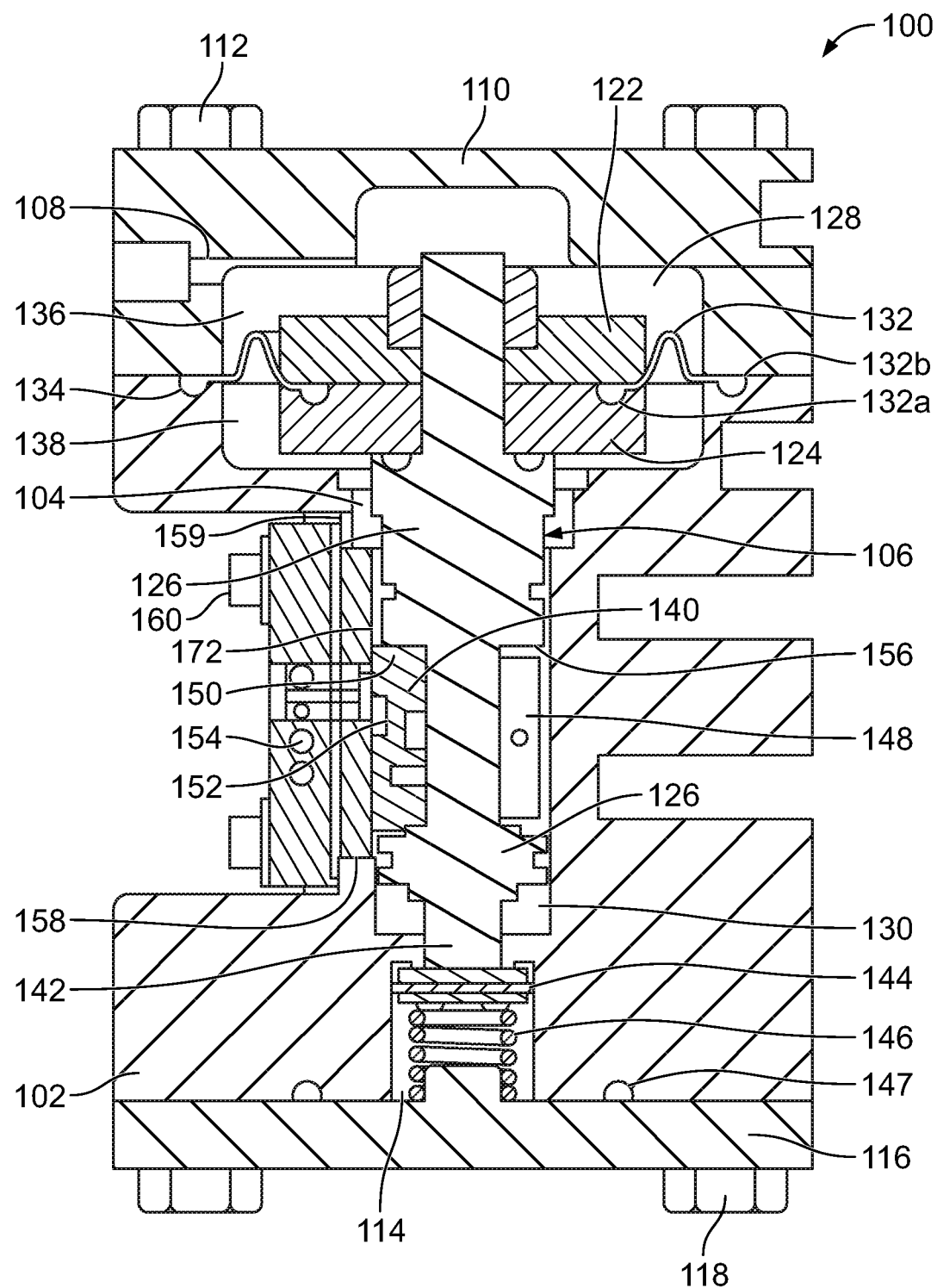
FIG. 1C is a side cross-sectional view of the main piston assembly.

With reference to FIGS. 1B-1C, the main piston subassembly generally includes a valve body 102 having a piston bore 104 configured for movably receiving a piston 106 therein. The valve body has an open top end 108 that is enclosed by a top cover plate 110 which is secured to the valve body by one or more top plate fasteners 112. In some non-limiting examples, the valve body may also have an open bottom end 114 that is enclosed by a bottom cover plate 116 which is secured to the valve body by one or more bottom plate fasteners 118. The piston bore may extend between the top end and a bottom end along a longitudinal axis 120 of the valve body. The top cover plate and the bottom cover plate, along with the top plate fasteners and the bottom plate fasteners, seal the piston bore of the valve body via seals 132 and 147. Each of the seals may be a gasket, an O-ring, a diaphragm, or the like.

With continued reference to FIGS. 1B-1C, the piston has a piston follower 122, a piston head 124, and a piston body 126 attached to a central portion of both the piston follower and the piston head and protruding therefrom in a direction toward the bottom end of the valve body.

The main piston is configured for movement within the piston bore in a direction along the longitudinal axis in response to a pressure differential between pressure cavities or sections located on a top side of the piston and the bottom side of the piston 106. The top and bottom sides of the piston head are separated by a diaphragm 132. As shown in FIG. 1C, a first end 132a of the diaphragm is fixedly connected between the piston follower and the piston head, while a second end 132b of the diaphragm is fixedly connected in a groove 134 in the valve body 102 by the top cover plate 110. The diaphragm 132 fluidly isolates the top and bottom sides of the piston head and is flexible to allow movement of the piston 106 in a direction along the longitudinal axis due to a pressure differential between the top and bottom sides of the piston head.

The diaphragm thus partitions the piston bore into a brake pipe section 136 on the top side of the piston head and a valve chamber section 138 (also known as a spool chamber or reference cavity) on the bottom side of the piston head and the piston body. The brake pipe section is in fluid communication with the brake pipe to receive pressurized air from the brake pipe. The valve chamber section has a slide valve 140 that moves with the piston to establish selective fluid communication between various ports and to control operation of the brake mechanism, as described herein.

A bottom end 142 of the piston has a check valve 144 and a spring 146 that positions the piston in a predetermined position in the valve body when the braking system is fully pressurized (i.e., when the braking system is in the release position). A bottom seal 147, such as an O-ring, seals the bottom of the piston bore against the bottom end plate.

Depending upon a pressure differential between the brake pipe section and the valve chamber section, the piston will move in a direction along the longitudinal axis to thereby control the function of the slide valve on a slide valve seat 154 to open and/or close respective air ports in both the slide valve face 152 and slide valve seat surface 172 to determine the braking function. When brake pipe pressure is exhausted, the pressure differential between the brake pipe section and the valve chamber section moves the piston in a direction toward the top end of the valve body. Conversely, when brake pressure is increased, the pressure differential between the brake pipe section and the valve chamber section moves the piston in a direction toward the bottom end of the valve body.

With continued reference to FIGS. 1B-1C, the slide valve is movable with movement of the piston. The slide valve has a pair of extensions 148 on opposing sides of a slide valve body 150. The extensions are positioned within a corresponding undercut 156 on the piston body such that the slide valve is fixed to move with movement of the piston. The slide valve body has a slide valve face that is configured for sliding movement relative to a slide valve seat surface 172 as the piston moves within the piston bore. The slide valve face defines a plurality of ports that interact with a corresponding plurality of ports on the slide valve seat surface to control various aspects of brake operation, as described herein. The slide valve face in one example, may be a planar surface.

With continued reference to FIGS. 1B-1C, the valve body may have an opening 158 extending through the sidewall of the valve body and into the piston bore. The opening may extend in a direction substantially perpendicular or transverse to the longitudinal axis. The opening is positioned between the open top end and the open bottom end. In one example, the opening may be oriented such that the opening faces the slide valve face. The opening may be surrounded by a mounting surface 159 for mounting a removable slide valve seat that encloses the opening. In some examples or aspects, the slide valve seat may be matingly and removably coupled to the valve body, such as by one or more fasteners 160 extending through one or more corresponding holes 162 (shown in FIG. 1B) extending through the slide valve seat. The fasteners may be threadably connected to corresponding threaded holes 161 (shown in FIG. 1B) on the mounting surface surrounding the opening. In other example embodiments, the fasteners may include bolts, screws, nails, adhesive, magnets, or the like. The slide valve seat may have one or more gaskets 164 to seal the opening at the interface between the mounting surface and the slide valve seat to prevent air leakage past the slide valve seat.

Removable and mating coupling of the slide valve seat to the valve body facilitates assembly and service of the main piston subassembly. Because the slide valve seat is not a pressed-in bushing, the surface of the slide valve seat that engages the slide valve face can be made without the use of specialized broaching equipment. Lapping of the slide valve seat sealing surface can be performed outside of the valve body before the slide valve seat is coupled to the valve body. External lapping of the slide valve seat surface significantly reduces the risk of introducing either lapping compound, lapping stone residue, and fine brass dust particles into the piston bore and the valve body. Furthermore, such external lapping improves the flatness of the surface of the slide valve seat that interacts with the slide valve for a reduction in leakage at the interface between the slide valve seat surface and the slide valve face.

The removable slide valve seat can also be easily treated to remove any burrs during manufacture of the slide valve seat without the risk of introducing metal shavings into the piston bore or the valve body. The slide valve seat can be easily coupled to, and removed from, the valve body. The coupling is done without requiring an expensive, time consuming, and labor intensive rework processes associated with pressing out the tapered main piston bushing, re-cleaning the valve body, and pressing in a new tapered bushing that is associated with conventional brake control valves. While the above-identified list of benefits of the removable and mating slide valve seat is non-exhaustive, it is illustrative of the cost and time savings that the removable slide valve seat provides over the conventional tapered cylindrical pressed-in main piston bushings.

Figure 2A:
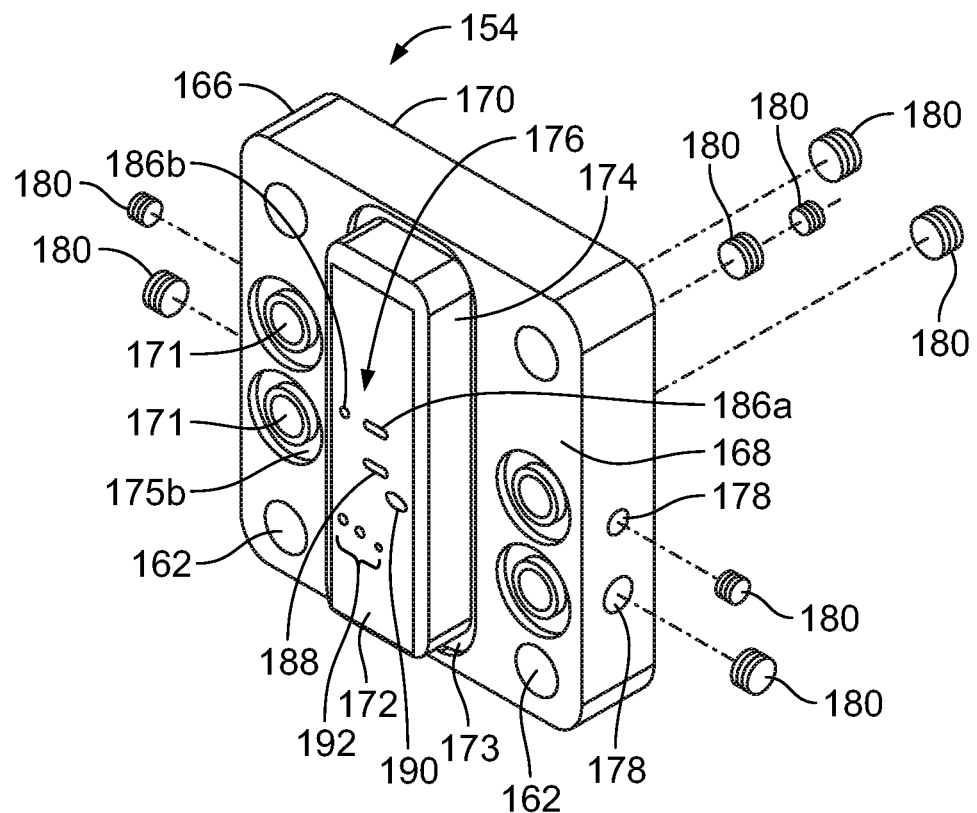
FIG. 2A is a front perspective view of a removable slide valve seat.
Figure 2B:
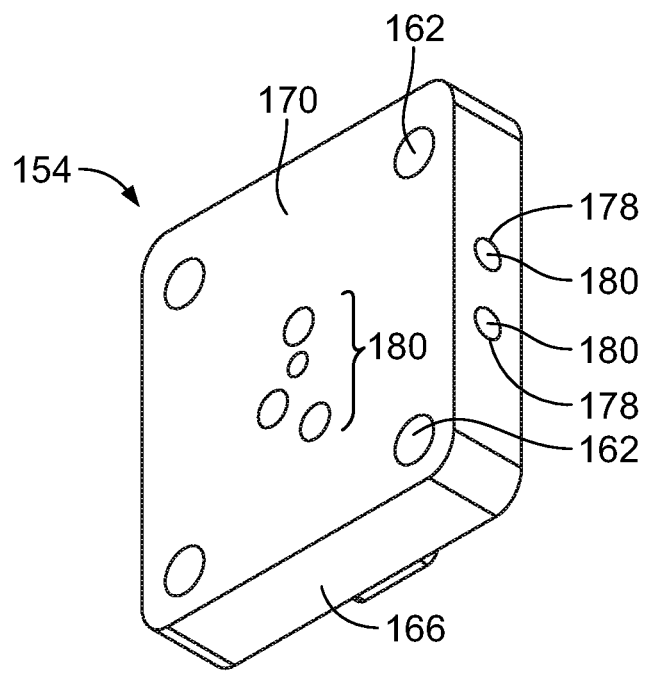
FIG. 2B is a rear perspective view of a removable slide valve seat.
Figure 2C:
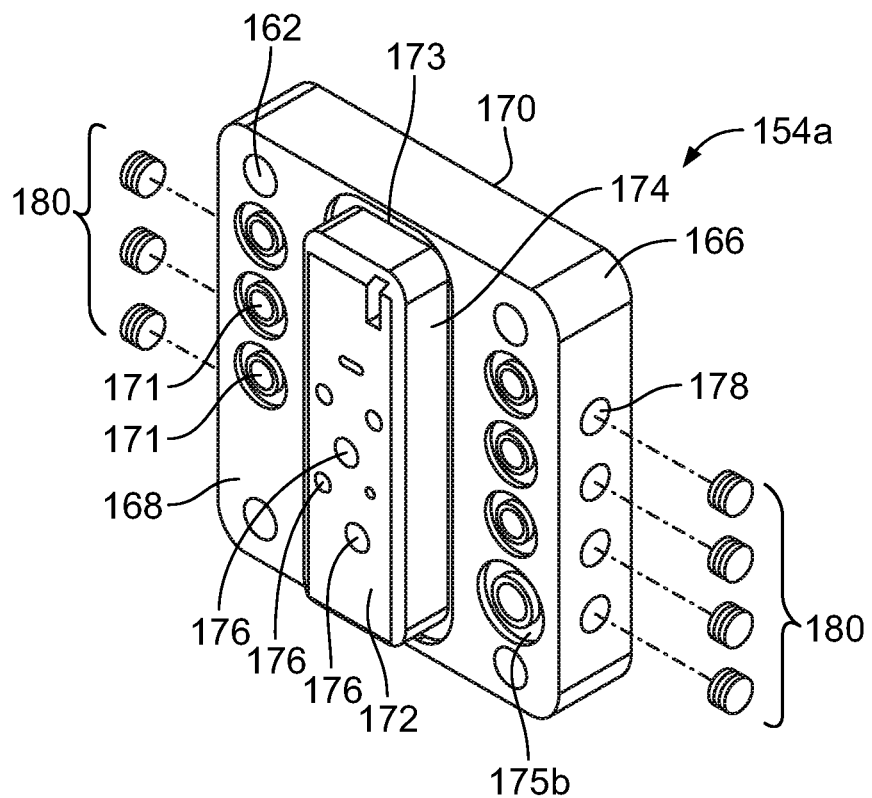
FIG. 2C is a front perspective view of a removable slide valve seat.
Figure 2D:
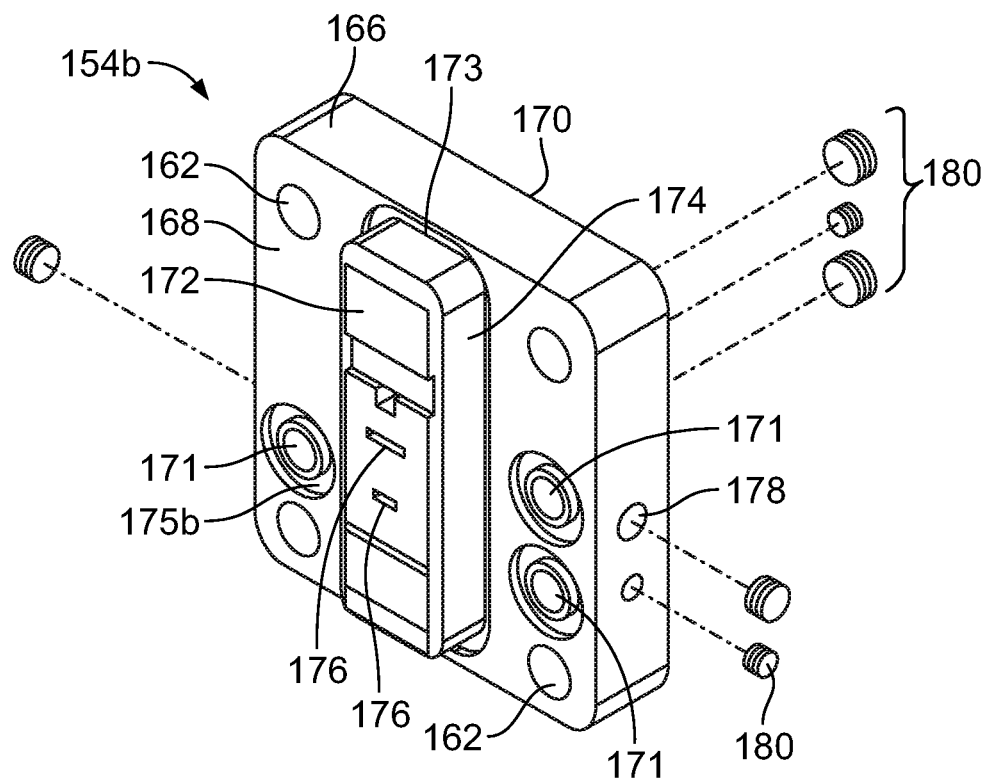
FIG. 2D is a front perspective view of a removable slide valve seat.

With reference to FIGS. 2A-2D, the slide valve seat 154, 154b is shown separate from the valve body. In some examples, the slide valve seat may be configured to be retrofit into an existing valve body of a main-line portion brake valve. In other examples or aspects, such as shown in FIG. 2C, the slide valve seat may be configured for use with a service portion of a brake control valve used in rail vehicle applications in markets governed by AAR standards. In other examples or aspects, such as shown in FIG. 2D, the slide valve seat may be configured for use with an emergency portion of a brake control valve used in rail vehicle applications in markets governed by AAR standards.

With continued reference to FIGS. 2A-2D, the slide valve seat may include a block-shaped body 166 having a substantially square or rectangular shape. In some examples or aspects, the slide valve seat is made from a metal material, such as brass or stainless steel. According to a particular embodiment of the invention, the slide valve seat is made from Type 304 stainless steel (ASTM A276). According to another particular embodiment, the slide valve seat may be made from a specialized brass material. In some examples, the slide valve seat is made by machining a solid block of material to have the desired shape and porting pattern required for interacting with the slide valve to provide various braking functions. In other examples, the slide valve seat may be made by an additive manufacturing process, such as metal 3D printing.

The body may have an inner surface 168 configured for contacting the valve body (shown in FIG. 1B) and an outer surface 170 opposite the inner surface. The inner surface and the outer surface may be planar surfaces. In some examples, one or more holes for receiving fasteners may be positioned at outer corners of the body and extend from the inner surface to the outer surface. The inner surface may further have one or more first connection ports 171 for fluidly connecting to the corresponding one or more second connection ports 165 on the mounting surface of the valve body surrounding the opening.

With continued reference to FIGS. 2A-2D, the body of the slide valve seat further has a slide valve seat surface 172 configured for engaging the slide valve face (shown in FIG. 1B). In some examples, the slide valve seat surface may be formed on a protrusion 174 that extends from the inner surface in a direction away from the inner surface. The slide valve seat surface may be a planar surface. A slide valve seat gasket 164 (FIG. 1B) may be located in a groove 173 to seal the interface between the slide valve seat and the valve body. Additionally, as illustrated in FIGS. 1B, and 2C-2D, a connection port seal 175A may be located into a groove 175B to seal each of the one or more connection ports.

The slide valve seat surface may have a slide valve seat porting pattern including a plurality of slide valve seat ports 176 extending into the body. The porting pattern of the slide valve seat ports on the seat surface interacts with the porting pattern on the slide valve face to establish proper porting connections between the slide valve and the valve body by way of the slide valve seat. In some examples or aspects, the ports include a pair of brake pipe ports 186*a*, 186*b* configured for fluid communication with the brake pipe, an additional discharge channel (ADC) piloting valve port 188, an ADC main port 190, and one or more atmospheric exhaust ports 192. The ADC ports provide for a 'local' exhausting of brake pipe and valve chamber pressures at individual brake control valves on each vehicle of a vehicle system to help increase service transmission signal time, as described herein. In some examples, the one or more exhaust ports may be three exhaust ports 192*a*, 192*b*, 192*c* (shown in FIGS. 4-9) having different cross sectional areas. In one example, the brake pipe ports may be considered first ports, the ADC piloting valve port and the ADC main port second ports, and the exhaust ports third ports. Although not shown, the porting patterns of various slide valve seat ports may be interconnected by plural machined or drilled passages and chambers defined within the body of the slide valve seat. Alternatively, other ports may be considered, first, second, third, nth ports. In this manner, the air pressure may be directed through the body in varying manners depending upon the relative position of the slide valve with respect to the slide valve seat and the alignment of the respective porting patterns thereof.

With continued reference to FIGS. 2A-2B, the body of the slide valve seat may have a plurality of drill holes or passages 178 that extend into the material of the body. The passages may be drilled or machined into the body during manufacture of the slide valve seat to allow for fluid connection between various slide valve seat ports on the slide valve seat with various ports on the slide valve face, as described herein. The passages in one example may be sealed with plugs 180.

Figure 3A:
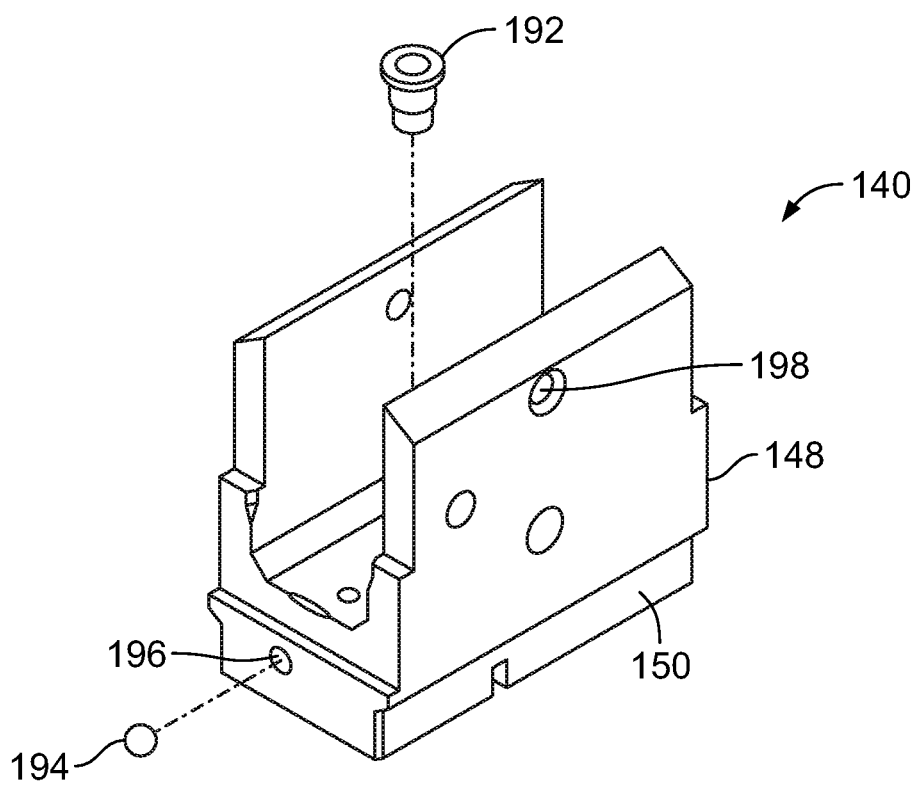
FIG. 3A is a rear perspective view of a slide valve.
Figure 3B:
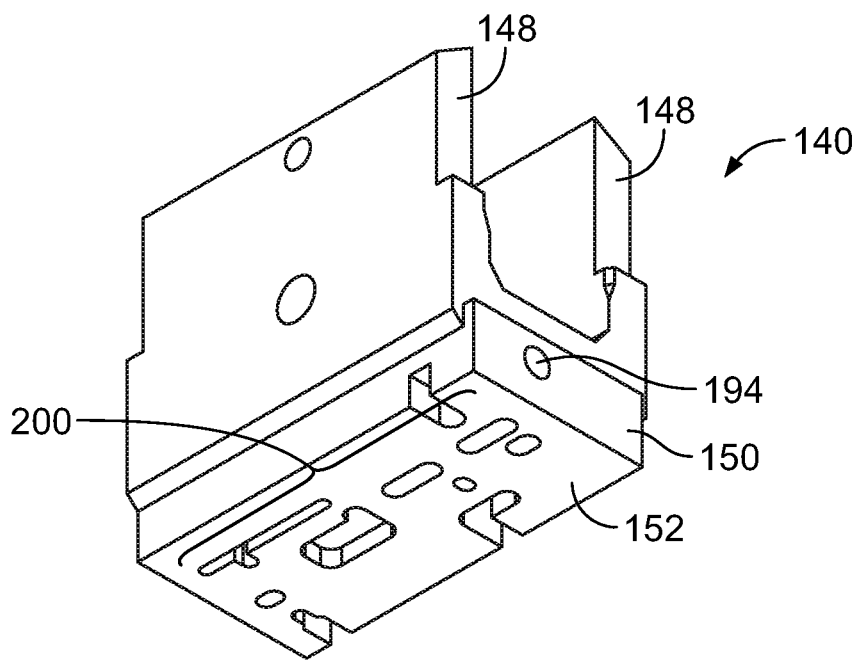
FIG. 3B is a front perspective view of a slide valve.

With reference to FIGS. 3A-3B, the slide valve is shown separate from the valve body. In some examples, the slide valve may be made from a metal material, such as stainless steel, brass, or the like. In an example, the slide valve may be made from Type 304 stainless steel (ASTM A276). The stainless steel material of the slide valve offers several advantages in comparison to the traditional brass material. In particular, the stainless steel material offers higher vibration/shock resistance, durability, and a higher thermal resistance, which increases the service life of the main piston subassembly and reduces its overall maintenance needs. Manufacturing the slide valve from the stainless steel material may also reduce or eliminate the galling wear caused by the brass on brass engagement between the slide valve and the slide valve seat when exposed to severe levels of vibration. The stainless steel material also maintains the performance characteristics of the brass material. In some examples, the slide valve may be made by machining a solid block of material to have the desired shape and porting pattern required for interacting with the slide valve seat to provide various braking functions. In other examples, the slide valve may be made by an additive manufacturing process, such as metal 3D printing or impregnated powdered metal.

With continued reference to FIGS. 3A-3B, the slide valve may include the pair of extensions on opposing sides of the slide valve body. The extensions may be configured for being positioned within a corresponding undercut on the piston body such that the slide valve is fixed to move with movement of the piston (see FIG. 1B). One or more slide valve plugs 194 may be provided to plug drill holes or passages 196 that extend into the material of the body. One or more filters 192 may be provided to filter one or more ports located in the slide valve. The extensions may have at least one aperture 198 configured for receiving a fastener (not shown) for connecting the slide valve to the main piston.

The slide valve body may include the slide valve face (shown in FIG. 3B) that may be configured for sliding movement relative to the slide valve seat surface as the piston moves within the piston bore. The slide valve face may have a slide valve porting pattern having a plurality of slide valve ports 200 extending into the slide valve body. Although not shown in FIGS. 3A-3B, the slide valve ports may be interconnected by a plurality of machined or drilled passages and chambers defined within the slide valve body. In this manner, the air pressure may be directed through the slide valve body in varying manners depending upon the relative position of the slide valve with respect to the slide valve seat and the alignment of the respective porting patterns thereof. The porting pattern of the ports on the slide valve face interact with the porting pattern of the ports on the seat surface to establish proper porting connections between the slide valve and the valve body by way of the slide valve seat as will be described herein.

Figure 4:
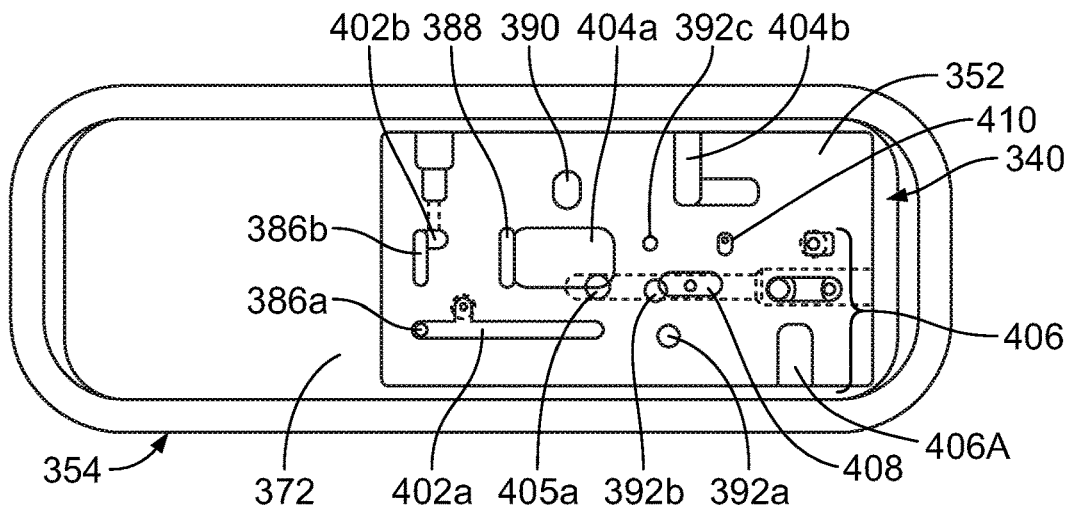
FIG. 4 is a front view schematic representation of a slide valve and the slide valve seat.

FIGS. 4-9 illustrate the movement of a slide valve 340 in relation to a slide valve seat 372 from a charging position to a final braking position. The dashed lines in the figures show fluid connections that are internal to the slide valve body. With reference to FIG. 4, in some examples, the ports may include a weeper port 402*a* and a valve chamber charging port 402*b* configured for selective fluid communication with the brake pipe ports 386*a* and 386*b* on the slide valve seat. An ADC pilot slot 404*a* may be configured for selective fluid communication with both the brake pipe port (386*b*) and the ADC pilot port 388 on the slide valve seat. Additionally, a valve chamber port 404*b* may be configured for selective communication with the ADC port 390 on the slide valve seat, and a valve chamber bleeder port 410 may be configured for selective communication with the atmospheric exhaust port 392*c* on the slide valve seat. A valve chamber port 406*c* may be configured for selective communication with the atmospheric exhaust port on the slide valve seat, and a brake pipe port 406*b* may be configured for selective communication with the atmospheric exhaust port 392*b* on the slide valve seat. An ADC pilot exhaust port 408 may be configured for selective communication with both the ADC pilot port 405*a* and the atmospheric exhaust port. Additionally, a valve chamber port 406*a* may be configured for selective communication with the atmospheric exhaust port, and an ADC pilot port may be configured to provide selective communication with the ADC pilot exhaust port and the brake pipe port 406*b* directly with the atmospheric exhaust port in the slide valve seat. Furthermore, the ADC pilot exhaust port may be in selective fluid communication with additional atmospheric exhaust ports (not shown).

In particular, the slide valve in FIG. 4 is shown in a release and charging position, such as when brakes may be released on a vehicle or during charging of the brake system following a brake application. In this charging position, the brake pipe pressure is higher than valve chamber pressure, thereby moving the main piston in a direction from the open top end toward the open bottom end (shown in FIG. 1A). With the slide valve in the charging and release position, brake pipe pressure charges the valve chamber section of the valve body based on alignment of the brake pipe ports on the slide valve seat with the valve chamber weeper ports and the valve chamber charging port on the slide valve face 452. In the charging position, the slide valve face blocks the ADC piloting port in the slide valve seat from communicating with the brake pipe port in the slide valve seat while allowing the ADC piloting port in the slide valve seat to communicate with both ADC pilot exhaust ports in the slide valve face to communicate with the atmospheric exhaust port in the slide valve seat. Additionally, the slide valve face may block the ADC port and the atmospheric exhaust ports and in the slide valve seat.

Figure 5:
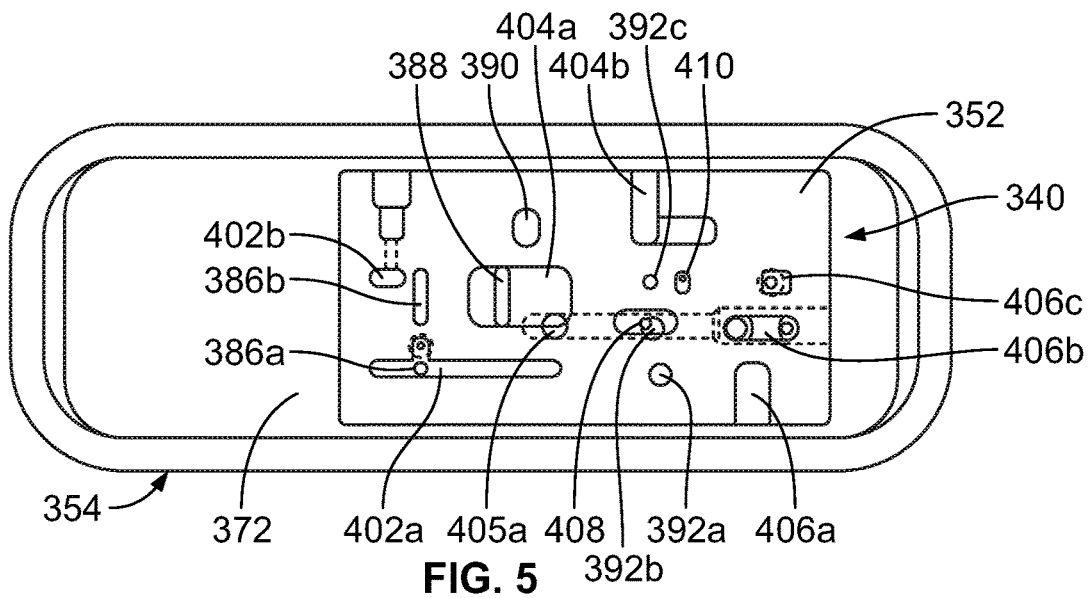
FIG. 5 is a front view schematic representation of a slide valve and the slide valve seat.

With reference to FIG. 5, the slide valve is shown in a fully charged position. In one example the charged position may be during movement of a vehicle before the brakes are applied. In the charged position, the brake pipe pressure port in the slide valve seat charges the valve chamber cavity through the valve chamber weeper port on the slide valve face. The slide valve face may block the brake pipe port in the slide valve seat from the valve chamber charging port in the slide valve face. The slide valve face blocks the ADC piloting port in the slide valve seat from communicating with the brake pipe port in the slide valve seat. Meanwhile, the ADC piloting port in the slide valve seat communicates with both ADC piloting ports along with the ADC pilot exhaust port in the slide valve face to communicate with the atmospheric exhaust port in the slide valve seat. Additionally, the slide valve face blocks the ADC port and the atmospheric exhaust ports in the slide valve seat.

Figure 6A:
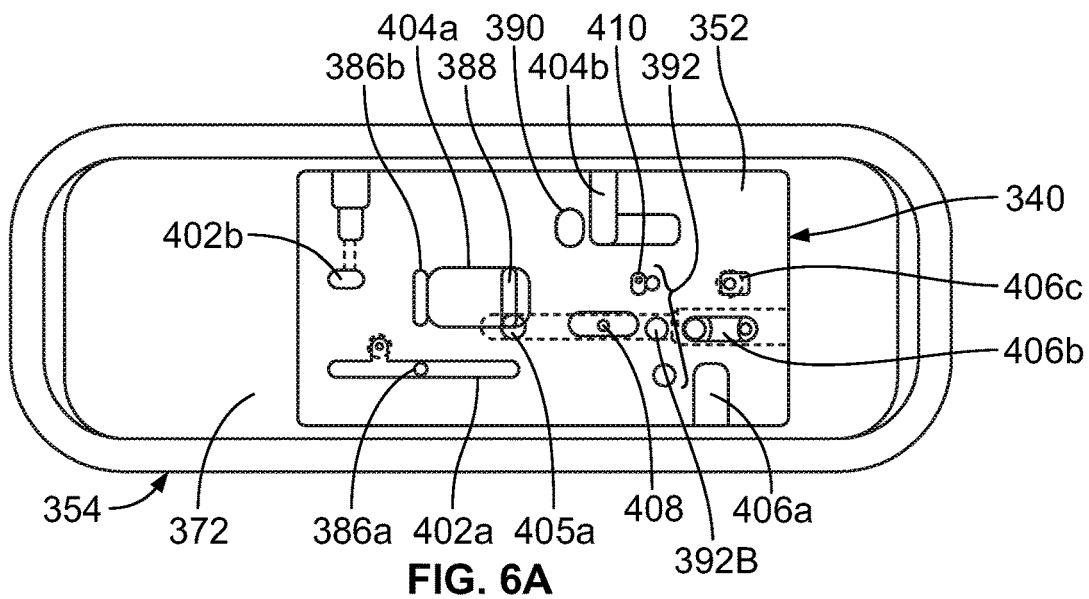
FIG. 6A is a front view schematic representation of a slide valve and the slide valve seat.

With reference to FIG. 6A, the slide valve is shown in the initial phase of a piloting position that starts the ADC function. In the initial phase of the ADC piloting position, the brake pipe pressure port in the slide valve seat is still in fluid communication with the valve chamber cavity through the valve chamber weeper port on the slide valve face. The brake pipe pressure port in the slide valve seat is in fluid communication with the ADC pilot port due to a partial alignment of the ADC pilot port in the slide valve face. The ADC pilot exhaust port in the slide valve face is now no longer in fluid communication with the atmospheric exhaust port in the slide valve seat. Likewise, the valve chamber bleeder port in the slide valve face is no longer in fluid communication with the atmospheric exhaust port in the slide valve seat. The slide valve face 352 may still be blocking the ADC port and all three atmospheric exhaust ports in the slide valve seat.

Figure 6B:
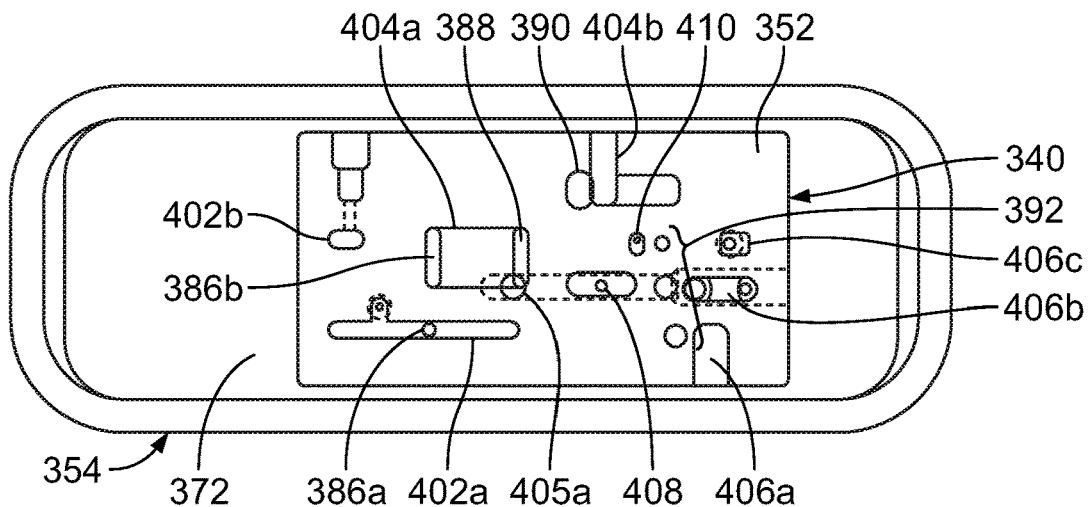
FIG. 6B is a front view schematic representation of a slide valve and the slide valve seat.

With reference to FIG. 6B, the slide valve is shown in its final phase of the piloting position which starts the ADC function. In this phase of the ADC piloting position, the brake pipe pressure port in the slide valve seat is still in fluid communication with the valve chamber cavity through the valve chamber weeper port on the slide valve face. The brake pipe pressure port in the slide valve seat is in fluid communication with the ADC pilot port due to now full alignment of the ADC pilot port in the slide valve face. The ADC piloting valve assembly (see FIG. 6C) may be configured for rapidly dropping brake pipe pressure locally at the valve to increase the service transmission speed of the initial brake application through all location of a vehicle. The valve chamber port in the slide valve face is now in fluid communication with the ADC port 190 in the slide valve seat to also decrease the valve chamber pressure. The slide valve face is blocking all three atmospheric exhaust ports in the slide valve seat.

Figure 6C:
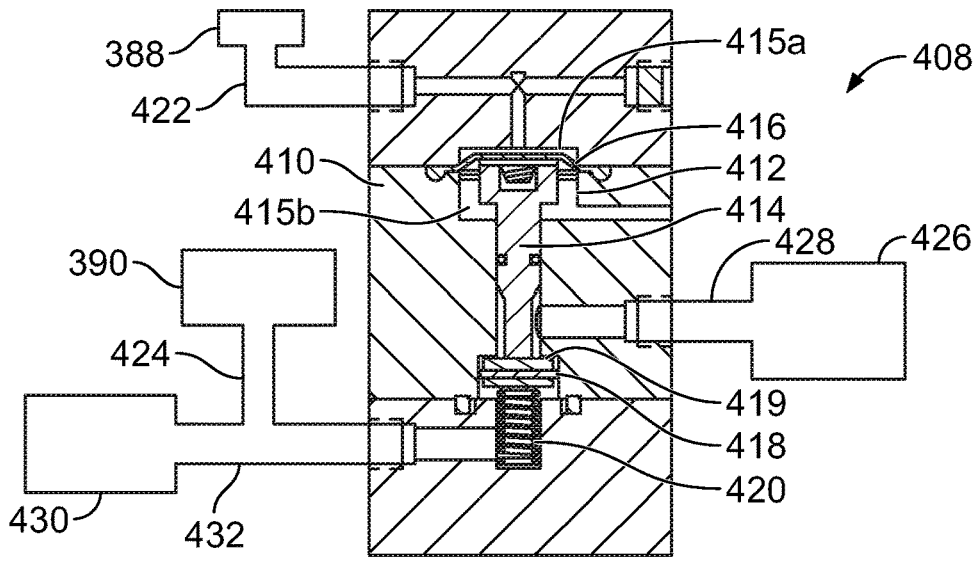
FIG. 6C is a side cross-sectional view of the additional discharge channel piloting valve.

With reference to FIG. 6C, the ADC piloting valve assembly may include a valve body having a piston bore 412 configured for movably receiving a piston 414 therein. The piston may be configured for movement within the piston bore in a direction along a longitudinal axis in response to a pressure subjected to the top pressure cavity 415a above the diaphragm 416. A bottom end of the piston may have a check valve 418 and a spring 420 that positions the piston toward the top end of the valve body. The check valve may be seated against a check valve seat 419 formed on the valve body and within the piston bore. The top pressure cavity is in selective fluid communication with the ADC piloting valve port on the slide valve seat via an ADC pilot channel port 422, while the bottom pressure cavity 415b is vented to atmospheric exhaust. Brake pipe pressure supply 426 from the distributor valve (FIG. 1B-1C) is supplied directly to the check valve seat and the check valve via a supply channel 428. Depending upon when the ADC pilot port is pressurized at the slide valve seat, brake pipe pressure from the brake pipe pressure port in the slide valve seat may flow into the ADC pilot channel port in the valve body and into the top pressure cavity of the ADC piloting valve assembly. The buildup of pressure inside the top pressure cavity may force the piston to move downward in a direction along the longitudinal axis within the piston bore to move the check valve off its seat. When the check valve is unseated, a rapid brake pipe pressure drop locally in the main-line portion occurs by filling the ADC main channel 424 and the ADC port with brake pipe pressure via the brake pipe supply channel. The ADC port is further connected to both the pipe bracket and the main portion 430 via the ADC supply channel 432.

As the ADC port is filled with brake pipe pressure as a result of the top pressure cavity being pressurized directly via the ADC port in the slide valve seat thus causing the piston to move downwards and open the check valve, the slide valve continues to move relative to the slide valve seat to a final phase of the ADC piloting process. With reference to FIG. 6B, the brake pipe pressure port in the slide valve seat is in full fluid communication with the ADC piloting port due to port in the slide valve face. Furthermore, the valve chamber port in the slide valve face may now be in fluid communication with the ADC port in the slide valve seat to also decrease the valve chamber pressure within the distributor valve. The slide valve face continues to block all three atmospheric exhaust ports in the slide valve seat.

Figure 7:
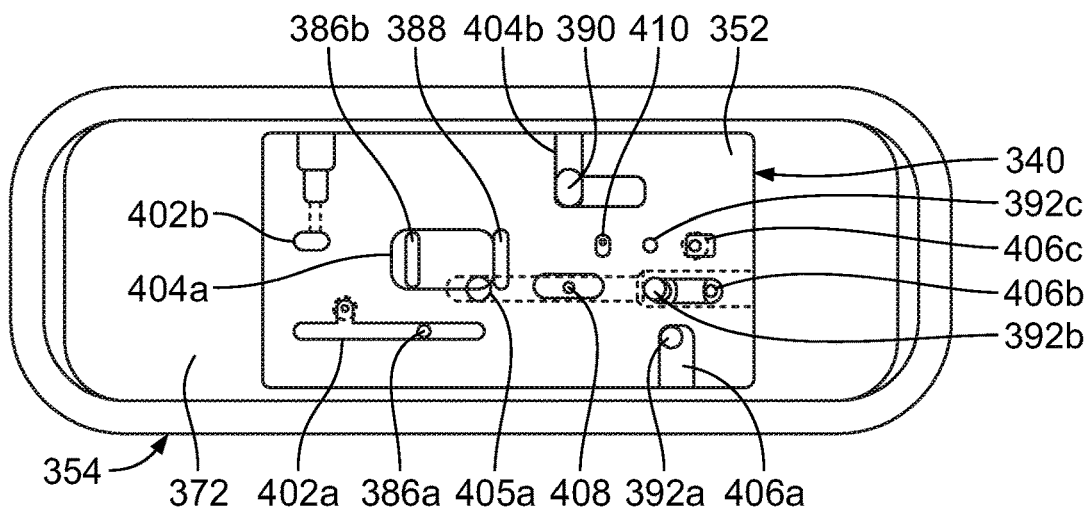
FIG. 7 is a front view schematic representation of a slide valve and the slide valve seat.
Figure 8:
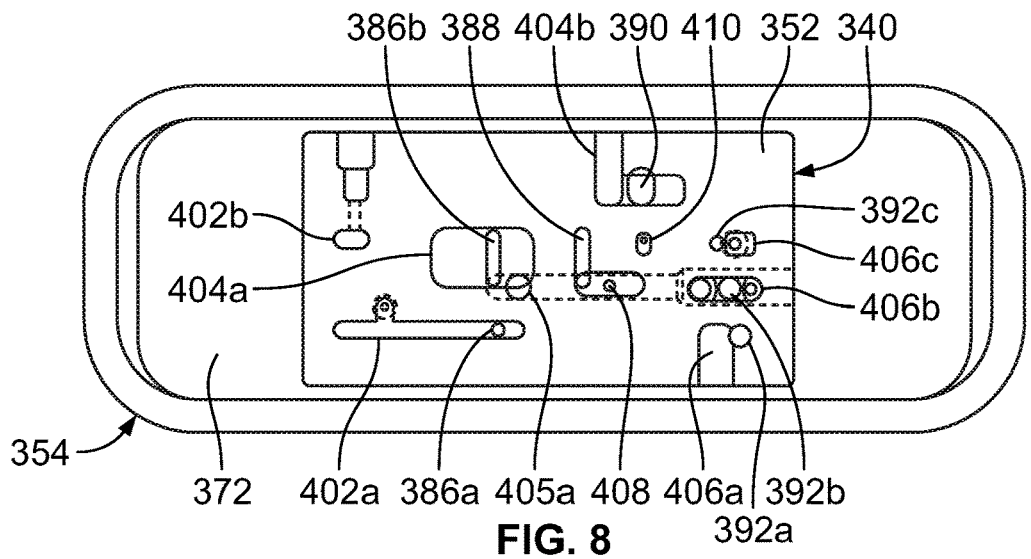
FIG. 8 is a front view schematic representation of a slide valve and the slide valve seat.
Figure 9:
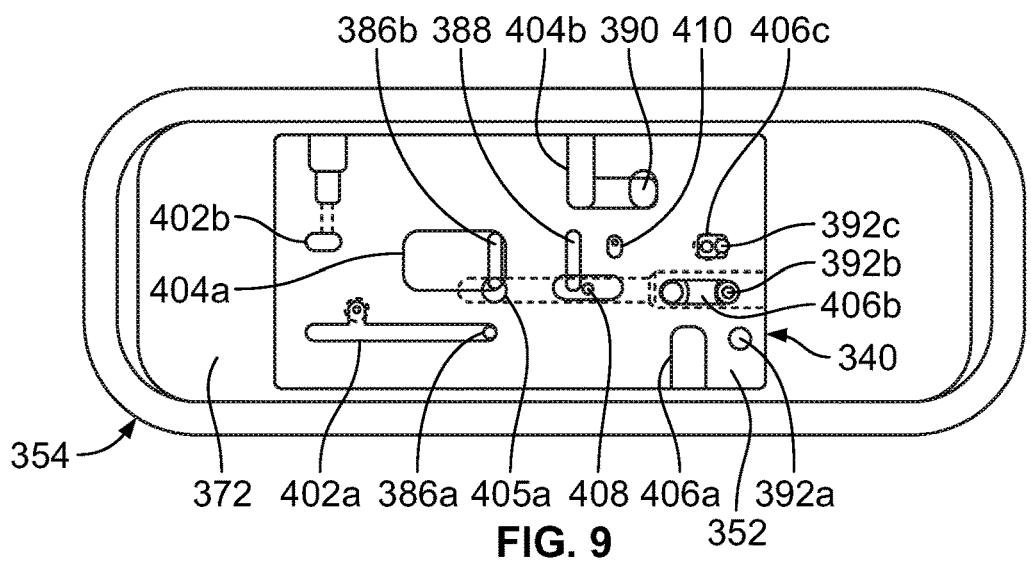
FIG. 9 is a front view schematic representation of a slide valve and the slide valve seat.

With reference to FIGS. 7-9, three different exhaust positions are illustrated that show an accelerated application function, where the position of the slide valve to the slide valve seat is dependent on the distance from the brake pipe air supply source during a braking application. The exhaust position may be provided when a vehicle is braking. In particular, in one example, such as when a rail vehicle is provided, the vehicle may be elongated or have plural vehicles, cars, etc. that all may need to be braked or serially braked. During a brake application of the vehicle, the specific rate of drop in brake pipe pressure is a function of a distance between each brake control valve and the vehicle (i.e., the source of brake pipe pressure). The closer the brake control valve is to the vehicle upon activation of the braking system, the faster rate of brake pipe pressure decrease is at that brake control valve. As a result of the accelerated application function a slower rate of brake pipe pressure decrease occurs in the brake control valve on those vehicles that are closest to the brake pipe air exhausting source. In one example, the brake air supply for exhaustion is located at the head of the vehicle system. In one example, the head of the vehicle system is a locomotive of a rail vehicle. Accordingly, it may be advantageous that the brake control valve may be designed to have varying rates of brake pipe and valve chamber pressure exhausted directly to atmosphere, based on a distance that the brake control valve if from the head of the vehicle.

With reference to FIG. 7, the slide valve is shown in a braking position for a brake control valve located at a first distance from the braking vehicle. In one example, the braking vehicle may be a rail car of a rail vehicle that is a great distance from a locomotive that represents the location of the brake pipe supply source. The brake pipe supply source is may refer to a source of braking pressure, or braking exhaust. The slide valve may be positioned relative to the slide valve seat such that the brake pipe port on the slide valve face may be in fluid communication with the atmospheric exhaust port in the slide valve seat to provide the fastest rate of brake pipe decrease locally in the brake control valve during the accelerated application function. Brake pipe pressure flows from the brake pipe pressure port in the slide valve seat to ports in the slide valve face and then out to the atmospheric exhaust port in the slide valve seat during the accelerated application function. The ADC port in the slide valve seat is fully open via the valve chamber port; however, the ADC function is now negated in the piston of the brake control valve because the piston has made a brake application. Furthermore, the valve chamber pressure port is in full fluid communication with the atmospheric exhaust port in the slide valve seat to also decrease the valve chamber section pressure of the valve chamber section of the piston bore of the brake control valve at its fastest rate locally in the brake control valve. The combined local venting of both brake pipe section, and valve chamber section pressures of the piston bore of the brake control valve out to atmosphere results in a faster rate of brake cylinder pressure development on those vehicles of a vehicle that are furthest away from the brake pipe supply source of the vehicle.

With reference to FIG. 8, the slide valve is shown in another example braking or exhaust position for a brake control valve. In the example, a vehicle having plural vehicles such as a rail vehicle, for vehicles or portions of the vehicle located in an intermediary position compared to the brake pipe supply source. The slide valve may be positioned relative to the slide valve seat such that the brake pipe port on the slide valve face may be centered and in fluid communication with the atmospheric exhaust port in the slide valve seat to provide an intermediate rate of brake pipe decrease locally in the brake control valve. Brake pipe pressure flows from the brake pipe pressure port in the slide valve seat to ports in the slide valve face and then out to the atmospheric exhaust port in the slide valve seat. The valve chamber pressure port may be in partial alignment, or partially coupled with the atmospheric exhaust port in the slide valve seat to also provide an intermediate rate of decrease valve chamber pressure locally in the brake control valve. Furthermore, the valve chamber port may be in partial alignment with the atmospheric exhaust port in the slide valve seat to provide a secondary source to vent valve pressure out to atmospheric exhaust port. The intermediate combined local venting of both brake pipe and valve chamber pressures out to atmosphere in the brake control valve may result in an intermediate rate of brake cylinder pressure development on those vehicles of a vehicle that are located near the middle of the vehicle, or vehicle system.

With reference to FIG. 9, the slide valve is shown in a braking position for a brake control valve. In the example, the braking vehicle or portion of the vehicle may be located near the brake pipe supply source. The slide valve may be positioned relative to the slide valve seat in its most upward position such that the brake pipe port on the slide valve face may be biased towards the smaller exhaust hole in the brake pipe port and in fluid communication with the atmospheric exhaust port in the slide valve seat to now provide a slow rate of brake pipe decrease locally in the brake control valve during the accelerated application function. Brake pipe pressure flows from the brake pipe pressure port in the slide valve seat to ports in the slide valve face and then out to the atmospheric exhaust port in the slide valve seat. The valve chamber pressure port may no longer be in fluid communication with the atmospheric exhaust port in the slide valve seat. The valve chamber port is fully coupled, or aligned with the atmospheric exhaust port in the slide valve seat to provide the slowest rate of valve chamber pressure decrease out to the atmospheric exhaust port locally in the brake control valve. The combined local venting of both brake pipe and valve chamber pressures out to atmosphere in the brake control valve results in a slower rate of brake cylinder pressure development on those vehicles that may be located near the brake pipe supply source. The variable accelerated application function that varies the exhaust function of the brake control valve may result in an appropriately uniform rate of brake cylinder pressure development on all vehicles in a vehicle system, which decreases the amount of longitudinal dynamic forces, thereby allowing the running of longer and heavier vehicles, including freight trains.

Figure 10:
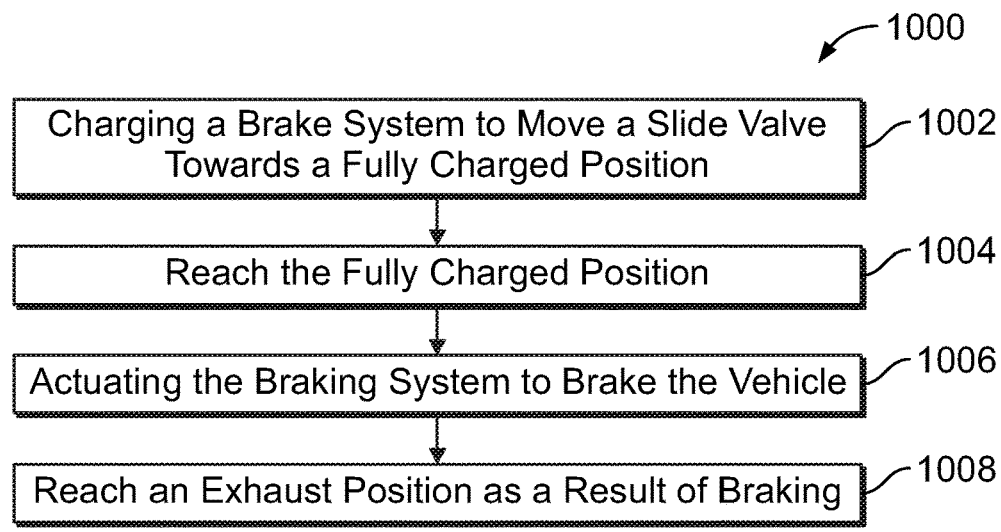
FIG. 10 is a block flow diagram of a method for applying and releasing brake pressure.

FIG. 10 illustrates a method 1000 for applying and releasing brake pressure with a brake system. The brake assembly may be for an off road vehicle, rail vehicle, etc. In one example, the brake system is a brake system as described in relation to FIGS. 1-9. Depending upon the pressure differential between the pressure cavities of the brake pipe and the valve chamber pressures, the piston moves the slide valve on its seat to open and/or close respective air ports in both the slide valve face and slide valve seat to dictate what type of function will occur within the brake assembly. The proper sequential opening/closing of ports in the slide valve face and slide valve seat may be dependent upon which direction the piston and slide valve is moving. When the brake pipe pressure is exhausting in the brake system, the pressure differential between both the brake pipe and valve chamber may allow the main piston to move upwards towards a top cover, thus providing various pneumatic functions along the way. When the brake pipe pressure is being increased in the brake system, the pressure differential between the brake pipe and valve chamber may allow the piston to move downwards towards the bottom cover, thus providing pneumatic functions along the way.

At 1002, a brake system is charging to move a slide valve towards a fully charged position. In one example, the slide valve of this is illustrated in FIG. 4. The brake system charges when the brake pipe pressure is higher than valve chamber pressure, thereby moving the main piston through a range of positions, and thus the slide valve, in a direction from the open top end toward the open bottom end. The release and charging positions in one example may include during charging of the brake system following a brake application.

In the charging position, the brake pipe ports on the slide valve seat align with the valve chamber weeper ports, and the valve chamber charging port on the slide valve face. The slide valve face blocks the ADC piloting port, preventing the ADC piloting port from communicating with the brake pipe port in the slide valve seat while allowing the ADC piloting port in the slide valve seat to communicate with both ADC piloting ports along with the ADC pilot exhaust port in the slide valve face. As a result, the ADC piloting port in the slide valve seat may communicate with the atmospheric exhaust port in the slide valve seat. Additionally, the slide valve face blocks the ADC port and the atmospheric exhaust ports and in the slide valve seat.

At 1004, the brake system becomes fully charged as the slide valve reaches the fully charged position. Unlike the charging position, only a single fully charged position is provided. FIG. 5 illustrates an example of the brake system within the fully charged position. In the fully charged position movement of the vehicle may be occurring before brakes are applied.

In this position, the brake pipe pressure port in the slide valve seat is now cutoff, no longer allowing the brake pipe to charge the valve chamber. Instead, the brake pipe charges the valve chamber cavity through the valve chamber weeper port on the slide valve face. The slide valve face blocks the brake pipe port in the slide valve seat from the valve chamber charging port in the slide valve face. The slide valve face blocks the ADC piloting port in the slide valve seat from communicating with the brake pipe port in the slide valve seat while allowing the ADC piloting port in the slide valve seat to communicate with both ADC piloting ports along with the ADC pilot exhaust port in the slide valve face to communicate with the atmospheric exhaust port in the slide valve seat. Additionally, the slide valve face blocks the ADC port and the atmospheric exhaust ports in the slide valve seat. In this manner, pressure feed to the ADC port and atmospheric exhaust ports in the slide valve seat are still closed by the slide valve when in this position on the slide valve seat.

At 1006, the braking system is actuated to brake the vehicle. Similar to when the slide valve is in the charging position, when the braking system is actuated, the slide valve is provided in a range of positions as the braking system goes from fully charged to a piloting position, also considered an ADC position. In one example, FIGS. 6A-6B show different positions when the braking system is going from fully charged to a piloting position. In the piloting position, the brake pipe pressure port in the slide valve seat is still in fluid communication with the valve chamber cavity through the valve chamber weeper port on the slide valve face. The brake pipe pressure port in the slide valve seat is in fluid communication with the ADC pilot port due to a partial alignment of the ADC pilot port in the slide valve face. The ADC pilot exhaust port in the slide valve face is now no longer in fluid communication with the atmospheric exhaust port in the slide valve seat. Likewise, the valve chamber bleeder port in the slide valve face is no longer in fluid communication with the atmospheric exhaust port in the slide valve seat. The slide valve face may still be blocking the ADC port and all three atmospheric exhaust ports in the slide valve seat.

In a final phase of the piloting position, the ADC function begins. In this phase of the piloting position, the brake pipe pressure port in the slide valve seat is still in fluid communication with the valve chamber cavity through the valve chamber weeper port on the slide valve face. The brake pipe pressure port in the slide valve seat is in fluid communication with the ADC pilot port due to now full alignment of the ADC pilot port in the slide valve face. The ADC piloting valve assembly is configured for rapidly dropping brake pipe pressure locally at the valve to increase the service transmission speed of the initial brake application through vehicles in a vehicle system. The valve chamber port in the slide valve face is now in fluid communication with the ADC port in the slide valve seat to also decrease the valve chamber pressure. The slide valve face is blocking all three atmospheric exhaust ports in the slide valve seat.

At 1008, the slide valve reaches an exhaust position as a result of braking. In example embodiments, FIGS. 7-9 each illustrate an exhaust position related to the accelerated application function when braking is occurring. During the brake application of the vehicle, the specific rate of drop in brake pipe pressure is a function of a distance between the brake control valve and the "vehicle" (i.e., the source of brake pipe pressure). The closer the brake control valve is to the "vehicle" upon activation of the braking system, the faster rate of brake pipe pressure decrease is at that brake control valve. Therefore, this will result in a slower rate of brake pipe pressure decrease as a result of the accelerated application function in brake control valves that are closer to the brake pipe supply source. In one example, the brake pipe supply source is in a lead vehicle such as a locomotive of a rail vehicle.

In the exhaust position, the slide valve may be positioned relative to the slide valve seat such that the brake pipe port on the slide valve face may be in fluid communication with the atmospheric exhaust port in the slide valve seat to provide the fastest rate of brake pipe pressure decrease locally in the brake control valve as a result of the accelerated application function. In one example, FIG. 7 illustrates the exhaust position related to the accelerated application function. Brake pipe pressure flows from the brake pipe pressure port in the slide valve seat to ports in the slide valve face and then out to the atmospheric exhaust port in the slide valve seat. The ADC port in the slide valve seat is fully open via the valve chamber port; however, the ADC function is now negated in the piston of the brake control valve because the piston has made a brake application. Furthermore, the valve chamber pressure port is in full fluid communication with the atmospheric exhaust port in the slide valve seat to also decrease the valve chamber section pressure of the valve chamber section of the piston bore of the brake control valve at its fastest rate locally in the brake control valve. The combined local venting of both brake pipe section, and valve chamber section pressures of the piston bore of the brake control valve out to atmosphere results in a faster rate of brake cylinder pressure development on those vehicles furthest away from the brake pipe supply source.

In another example, the slide valve may be positioned relative to the slide valve seat such that the brake pipe port on the slide valve face may be centered and in fluid communication with the atmospheric exhaust port in the slide valve seat to provide an intermediate rate of brake pipe pressure decrease locally in the brake control valve as a result of the accelerated application function. In one example, FIG. 8 illustrates this position. Brake pipe pressure flows from the brake pipe pressure port in the slide valve seat to ports in the slide valve face and then out to the atmospheric exhaust port in the slide valve seat. The valve chamber pressure port may be in partial alignment, or partially coupled with the atmospheric exhaust port in the slide valve seat to also provide an intermediate rate of decrease valve chamber pressure locally in the brake control valve. Furthermore, the valve chamber port may be in partial alignment with the atmospheric exhaust port in the slide valve seat to provide a secondary source to vent valve pressure out to atmospheric exhaust port. The intermediate combined local venting of both brake pipe and valve chamber pressures out to atmosphere in the brake control valve may result in an intermediate rate of brake cylinder pressure development on those vehicles that are located near the middle of the vehicle system.

Alternatively, the slide valve may be positioned relative to the slide valve seat in its most upward position such that the brake pipe port on the slide valve face may be biased towards the smaller exhaust hole in the brake pipe port and in fluid communication with the atmospheric exhaust port in the slide valve seat to now provide a slow rate of brake pipe pressure decrease locally in the brake control valve as a result of the accelerated application function. In one example, this position is illustrated in FIG. 9. Brake pipe pressure flows from the brake pipe pressure port in the slide valve seat to ports in the slide valve face and then out to the atmospheric exhaust port in the slide valve seat. The valve chamber pressure port may no longer be in fluid communication with the atmospheric exhaust port in the slide valve seat. The valve chamber port is fully coupled, or aligned with the atmospheric exhaust port in the slide valve seat to provide the slowest rate of valve chamber pressure decrease out to the atmospheric exhaust port locally in the brake control valve. The combined local venting of both brake pipe and valve chamber pressures out to atmosphere in the brake control valve results in a slower rate of brake cylinder pressure development on those vehicles that may be located nearest the brake pipe supply source. The variable accelerated application function and resulting exhaust function of the brake control valve may result in an appropriately uniform rate of brake cylinder pressure development on all vehicles in a vehicle system, which decreases the amount of longitudinal dynamic forces, thereby allowing the running of longer and heavier vehicles such as freight trains.

By varying rates of both brake pipe and valve chamber pressures being exhausted directly to the atmosphere based on each distributor valves relative location with respect to the brake pipe supply source provides advantages. Having varying exhaust rates for both brake pipe and valve chamber within the distributors valve may be an essential parameter that allows for the reliable operation of long, heavy vehicles without the occurrence of dangerous longitudinal dynamic vehicle forces.

By providing a faster combined brake pipe and valve chamber pressure exhaust to the atmosphere locally at the distributor valve results in a faster rate of pressure development of a brake cylinder pressure on those wheels located the furthest away from the brake pipe supply source. In particular the further a distributor valve is located away from the vehicles of a vehicle system whose brake valve handle is solely responsible for exhausting the brake pipe pressure in the brake pipe line of a vehicle to atmosphere to initiate the original brake application, the slower the rate of brake pipe decrease is observed at the distributor valve portion during the accelerated application function.

Thus provided, is a brake control valve assembly with a removable slide valve seat. The removable slide valve seat eliminates difficult machining processes, including tapering bores for replacement of the valve seat. This also includes eliminating the need for a broaching operation, saving significant manufacturing time and costs associated with the broaching process. Additionally, leakage issues between a pressed in bushing and a tapered bore are eliminated. To this end, by removing the bushing, bushing port to port leakage is also eliminated. As a result, manual tear down for maintenance or replacement is no longer needed, again saving time and cost. Additionally, the control valve has increased modularity, also facilitating maintenance. The brake control valve assembly also allows for port to port connection to be sealed with rubber, instead of less effective paint, or metal to metal seals. Lapping of the slide valve seat in removable seat design can now be done exterior of the portion body, again facilitating manufacturing. Consequently, the internal portion body is kept cleaner by not introducing lapping compound/media/grit into slide valve ports. Additionally, the seat lapping process no longer has to be done manually, and instead can be lapped on an automatic lapping machine. The automatic lapping additionally provides the advantage of reducing, if not eliminating variation in slide valve flatness. By eliminating variation, lower leakage values between the slide valve and slide valve interface are achieved.

In one or more embodiments, an assembly may be provided that may include a valve body having a piston within a piston bore in the valve body, the piston bore including a valve chamber section and a brake pipe section such that a pressure differential between the valve chamber section and the brake pipe section moves the piston within the piston bore. The assembly may also include a slide valve seat coupled to the valve body. The slide valve seat may include a brake pipe port. The assembly may also include an additional discharge channel pilot valve port, and at least one exhaust port, and a slide valve coupled to the piston and configured to move along the slide valve seat with the piston. The slide valve may be configured to move to establish selective fluid communication between the brake pipe port, the additional discharge channel pilot valve port, and the at least one exhaust port based on a position of the slide valve relative to the slide valve seat. The slide valve may be configured to move between at least a piloting position and an exhaust position. The brake pipe port may be in fluid communication with the additional discharge channel pilot valve port while the slide valve is in the piloting position, and the brake pipe port may be in fluid communication with the at least one exhaust port while the slide valve is in the exhaust position. The slide valve may also be configured to move between the piloting position and the exhaust position to vary an exhaust rate of the brake pipe section and an exhaust rate of the valve chamber section during braking.

Optionally, the slide valve may be configured to move to a charging position where the brake pipe port is in fluid communication with the valve chamber section to charge the valve chamber section from fluid received by a brake pipe channel.

Optionally, the slide valve seat may include a weeper port that fluidly couples the valve chamber section within a brake pipe channel, and the slide valve may be configured to have a charged position where the weeper port is fluidly coupled to the brake pipe channel. The brake pipe port, the additional discharge channel pilot valve port, and the at least one exhaust port may be blocked from fluid communication with each other while the slide valve is in the charged position.

Optionally, the piloting position of the slide valve may include when the brake pipe port is partially fluidly coupled to the additional discharge channel pilot valve port, or when the brake pipe port is fully fluidly coupled to the additional discharge channel pilot valve port, and the valve chamber section is partially fluidly coupled to an auxiliary addition discharge channel port to begin exhausting fluid from the valve chamber section.

Optionally, the exhaust position may include the brake pipe port and the additional discharge channel pilot valve port being fluidly coupled to the at least one exhaust port. In one aspect, the at least one exhaust port may include similarly sized first and second exhaust ports and a smaller third exhaust port. In another aspect, the slide valve seat may be configured to be removably coupled with the valve body.

Optionally, the slide valve seat may be removably coupled with the valve body with at least one of a bolt, a screw, a nail, a press fit, a magnetic coupling, or a removable adhesive.

Optionally, the assembly may also include an additional discharge channel piloting valve assembly fluidly coupled to the slide valve seat to selectively receive brake pipe fluid from the additional discharge channel piloting valve port and supply brake pipe pressure to the valve chamber section. In one aspect, the additional discharge channel piloting valve assembly may include a piloting piston movable within a piloting bore of a piloting body, and the piloting piston may include a check valve configured to supply brake pipe pressure to an auxiliary additional discharge channel port of the slide valve seat.

In one or more embodiments, a method may be provided that may include moving a piston having a slide valve within a piston bore having a valve chamber section and a brake pipe section based on a pressure differential between the valve chamber section and the brake pipe section, conveying brake pipe fluid through a brake pipe port of a slide valve seat to the valve chamber section, an additional discharge channel pilot valve port, and at least one exhaust port based on movement of the slide valve in relation to the slide valve seat, and varying an exhaust rate of the brake pipe fluid from the brake pipe section and the valve chamber section during braking of a vehicle based on a position of the slide valve in relation to the slide valve seat.

Optionally, the method may include charging the valve chamber section by conveying the brake pipe fluid from the brake pipe port to the valve chamber section when the slide valve is in a charging position relative to the slide valve seat.

Optionally, the method may include charging the valve chamber section only by conveying the brake pipe fluid from a weeper port to the valve chamber section when the slide valve is not in a charging position relative to the slide valve seat.

Optionally, the method may include moving the slide valve in a first direction to fluidly couple the brake pipe port to the additional discharge channel pilot valve port to supply brake pipe pressure to the valve chamber section, and continue moving the slide valve in the first direction to fluidly couple the valve chamber section to an auxiliary additional discharge channel port to exhaust the brake pipe fluid from the valve chamber section.

Optionally, the method may include fluidly coupling the brake pipe port to the at least one exhaust port during the braking of the vehicle.

Optionally, the at least one exhaust port may include a first exhaust port and a second exhaust port. In one aspect, to vary the exhaust rate of the brake pipe fluid from the brake pipe section and the valve chamber section during the braking of the vehicle, in a first exhaust position of the slide valve coupling the brake pipe port to only the first exhaust port, and in a second exhaust position, coupling the brake pipe port to the first exhaust port and the second exhaust port.

In one or more embodiments, an assembly may be provided that may include a body having a bore and a piston movable within the bore, the bore including a valve chamber section and a brake pipe section wherein a pressure differential between the valve chamber section and the brake pipe section moves the piston within the bore. The assembly may also include a seat configured to mate with and be removably coupled with the body, the seat including a first port, a second port, and a third port, and a slide valve coupled to the piston and configured for movement with the piston. The slide valve may be configured to move along the seat to establish selective fluid communication between the first port, the second port, and the third port based on a slide valve position relative to the seat. The slide valve may be configured to have an exhaust position where the first port is in fluid communication with the third port to vary an exhaust rate of the brake pipe section and of the valve chamber section during braking.

Optionally, the matingly and removably coupling of the seat to the body may not a broached coupling.

Optionally, the seat may be matingly and removably coupled to the body with at least one fastener.

Optionally, the at least one fastener may be one of a bolt, a screw, a nail, a press fit, a magnetic coupling, or a removable adhesive.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An assembly comprising:
    a valve body having a piston within a piston bore in the valve body, the piston bore including a valve chamber section and a brake pipe section such that a pressure differential between the valve chamber section and the brake pipe section moves the piston within the piston bore;
    a slide valve seat coupled to the valve body, the slide valve seat including a brake pipe port, an additional discharge channel pilot valve port, and at least one exhaust port;
    a slide valve coupled to the piston and configured to move along the slide valve seat with the piston, the slide valve configured to move to establish selective fluid communication between the brake pipe port, the additional discharge channel pilot valve port, and the at least one exhaust port based on a position of the slide valve relative to the slide valve seat;
    wherein the slide valve is configured to move between at least a piloting position and an exhaust position, the brake pipe port in fluid communication with the additional discharge channel pilot valve port while the slide valve is in the piloting position, the brake pipe port in fluid communication with the at least one exhaust port while the slide valve is in the exhaust position, the slide valve configured to move between the piloting position and the exhaust position to vary an exhaust rate of the brake pipe section and an exhaust rate of the valve chamber section during braking; and an additional discharge channel piloting valve assembly fluidly coupled to the slide valve seat to selectively receive brake pipe fluid via the additional discharge channel pilot valve port to an auxiliary additional discharge channel port.

2. The assembly of claim 1, wherein the slide valve is configured to move to a charging position where the brake pipe port is in fluid communication with the valve chamber section to charge the valve chamber section from fluid received by a brake pipe channel.

3. The assembly of claim 1, wherein the slide valve includes a weeper port that fluidly couples the valve chamber section within a brake pipe channel, and the slide valve is configured to have a charged position where the weeper port is fluidly coupled to the brake pipe channel, wherein the brake pipe port, the additional discharge channel pilot valve port, and the at least one exhaust port are blocked from fluid communication with each other while the slide valve is in the charged position.

4. The assembly of claim 1, wherein the piloting position of the slide valve includes wherein the brake pipe port is partially fluidly coupled to the additional discharge channel pilot valve port, or wherein the brake pipe port is fully fluidly coupled to the additional discharge channel pilot valve port, and the valve chamber section is partially fluidly coupled to an auxiliary additional discharge channel port to begin exhausting fluid from the valve chamber section.

5. The assembly of claim 1, wherein the exhaust position includes the brake pipe port and the additional discharge channel pilot valve port being fluidly coupled to the at least one exhaust port.

6. The assembly of claim 5, wherein the at least one exhaust port includes similarly sized first and second exhaust ports and a smaller third exhaust port.

7. The assembly of claim 6, wherein the slide valve seat is configured to be removably coupled with the valve body.

8. The assembly of claim 7, wherein the slide valve seat is removably coupled with the valve body with at least one of a bolt, a screw, a nail, a press fit, a magnetic coupling, or a removable adhesive.

9. The assembly of claim 1, wherein the additional discharge channel piloting valve assembly includes a piloting piston movable within a piloting bore of a piloting body, the piloting piston including a check valve configured to supply brake pipe pressure to the auxiliary additional discharge channel port of the slide valve seat.

10. A method comprising:
moving a piston having a slide valve within a piston bore having a valve chamber section and a brake pipe section based on a pressure differential between the valve chamber section and the brake pipe section;
conveying brake pipe fluid through a brake pipe port of a slide valve seat to the valve chamber section, an additional discharge channel pilot valve port, and at least one exhaust port based on movement of the slide valve in relation to the slide valve seat;
varying an exhaust rate of the brake pipe fluid from the brake pipe section and the valve chamber section during braking of a vehicle based on a position of the slide valve in relation to the slide valve seat; and
moving the slide valve in a first direction to fluidly couple the brake pipe port to the additional discharge channel pilot valve port and to supply brake pipe pressure to the valve chamber section, and continue moving the slide valve in the first direction to fluidly couple the valve chamber section to an auxiliary additional discharge channel port to exhaust the brake pipe fluid from the valve chamber section.

11. The method of claim 10, comprising charging the valve chamber section by conveying the brake pipe fluid from the brake pipe port to the valve chamber section when the slide valve is in a charging position relative to the slide valve seat.

12. The method of claim 10, comprising charging the valve chamber section only by conveying the brake pipe fluid from a weeper port to the valve chamber section when the slide valve is not in a charging position relative to the slide valve seat.

13. The method of claim 10, comprising fluidly coupling the brake pipe port to the at least one exhaust port during the braking of the vehicle.

14. The method of claim 10, wherein the at least one exhaust port includes a first exhaust port and a second exhaust port, and to vary the exhaust rate of the brake pipe fluid from the brake pipe section and the valve chamber section during the braking of the vehicle, in a first exhaust position of the slide valve coupling the brake pipe port to only the first exhaust port, and in a second exhaust position, coupling the brake pipe port to the first exhaust port and the second exhaust port.

15. An assembly comprising:
a body having a bore and a piston movable within the bore, the bore including a valve chamber section and a brake pipe section wherein a pressure differential between the valve chamber section and the brake pipe section moves the piston within the bore;
a seat configured to mate with and be removably coupled with the body, the seat including a first port, a second port, and a third port; and
a slide valve coupled to the piston and configured for movement with the piston, the slide valve configured to move along the seat to establish selective fluid communication between the first port, the second port, and the third port based on a slide valve position relative to the seat;
wherein the slide valve is configured to have an exhaust position where the first port is in fluid communication with the third port to vary an exhaust rate of the brake pipe section and of the valve chamber section during braking;
wherein the first port and second port are similarly sized, and the third port is smaller than the first port and second port.

16. The assembly of claim 15, wherein the matingly and removably coupling of the seat to the body is not a broached coupling.

17. The assembly of claim 15, wherein the seat is matingly and removably coupled to the body with at least one fastener.

18. The assembly of claim 17, wherein the at least one fastener is one of a bolt, a screw, a nail, a press fit, a magnetic coupling, or a removable adhesive.

19. The assembly of claim 15, further comprising: an additional discharge channel piloting valve assembly fluidly coupled to the seat to selectively receive brake pipe fluid via the second port to an auxiliary additional discharge channel port.

20. The assembly of claim 19, wherein the additional discharge channel piloting valve assembly includes a piloting piston movable within a piloting bore of a piloting body, the piloting piston including a check valve configured to supply brake pipe pressure to the second port of the seat.

\* \* \* \* \*